United States Patent [19]

Beauducel et al.

[11] 4,365,320
[45] Dec. 21, 1982

[54] DEVICE FOR DETERMINING THE INSTANT OF RECEPTION OF AN ACOUSTIC WAVE

[75] Inventors: Claude Beauducel, Henouville; Jacques Cretin, Le Chesnay, both of France

[73] Assignees: Institut Francais du Petrole, Rueil-Malmaison; Compagnie Generale de Geophysique, Massy, both of France

[21] Appl. No.: 184,496

[22] Filed: Sep. 5, 1980

[30] Foreign Application Priority Data

Sep. 5, 1979 [FR] France .................. 79 22364

[51] Int. Cl.³ ................. G01V 1/28; G01V 1/38
[52] U.S. Cl. ....................... 367/21; 367/27; 367/55; 370/85
[58] Field of Search ........... 367/15, 21, 26, 27, 367/55, 78, 79; 370/85

[56] References Cited

U.S. PATENT DOCUMENTS

| | | | |
|---|---|---|---|
| 3,220,503 | 11/1965 | Oakley | 367/55 |
| 3,292,141 | 12/1966 | Hines et al. | 367/21 |
| 3,525,072 | 8/1970 | Born et al. | 367/21 |
| 3,624,599 | 11/1971 | Hibbard | 367/55 |
| 3,866,161 | 2/1975 | Barr et al. | 367/21 |
| 3,911,226 | 10/1975 | Angelle et al. | 370/85 |
| 3,963,870 | 6/1976 | Cander et al. | 370/85 |
| 3,986,162 | 10/1976 | Cholez et al. | 367/79 |
| 4,052,567 | 10/1977 | MacKay | 370/85 |
| 4,107,660 | 8/1978 | Chlebow | 367/21 |

FOREIGN PATENT DOCUMENTS

| | | | |
|---|---|---|---|
| 602895 | 3/1978 | U.S.S.R. | 367/21 |
| WO79/00351 | 6/1979 | PCT Int'l Appl. | 370/85 |

OTHER PUBLICATIONS

Abocs, "Sea Bottom . . . Sound Arrivals", 4/49, pp. 123–132, Geophysics.

Primary Examiner—Nelson Moskowitz
Attorney, Agent, or Firm—Millen & White

[57] ABSTRACT

A device for the sequential transmission of information elements from a sensor arrangement receiving acoustic waves at different locations and a system for recording or processing these information elements. The device includes means for generating information signals representative of the instant of reception at one of said sensor means of a directly transmitted acoustic wave emanating from a source, in the form of at least two discrete values of a continuously varying voltage which begins to be generated at the instant of reception of the direct wave, and means for determining the instant of reception from said discrete values are provided, after their transmission to the recording or processing system by a sequential transmission of the discrete values.

12 Claims, 4 Drawing Figures

DEVICE FOR DETERMINING THE INSTANT OF RECEPTION OF AN ACOUSTIC WAVE

BACKGROUND OF THE INVENTION

This invention concerns a device for determining the instant of reception of an acoustic wave received at a sensor intermittently connected to a recording or a processing system.

More particularly, the device is adapted to determine the instant of reception of acoustic waves directly received from a seismic source after triggering thereof, by means of a sensor arranged in a seismic streamer comprising a system for the sequential transmission of the information received at each of the sensors or sensor groups thereof.

The recording of the instant of arrival of the first acoustic wave received at the sensor of the seismic streamer, after the triggering of the seismic source, hereinafter designated as the reference instant of time, allows, by means of a comparison, to the determination of the propagation time of the echoes received after the reference time and, consequently, the depth of the subterranean layers producing these echoes can be determined.

In the reception systems of the prior art type, the reference time is determined by making use of a special sensor generally located at the head of the seismic streamer and permanently connected to the signal recording or processing system arranged on a ship, in the case of marine seismic prospecting, by means of a highpass filter, i.e., an element adapted to detect the envelope of the filtered signal and a Schmitt trigger adapted to be triggered when the level of the detected signal is higher than an adjustable threshold value. The reference time is known with accuracy due to the permanent connection between the sensor and the recording or the processing system. This permanent connection of the special sensor is not only present in the conventional prior art seismic streamers where each sensor or sensor group is connected through conductors to the recording or processing system, but also in the seismic streamers where the transmission of information is achieved through a sequential transmission system called multiplexing system, and is provided in order to avoid an unacceptable inaccuracy in the detection of the reference instant, a disadvantage inherent in the very principle of the discontinuous connection mode of operation which characterizes multiplexing transmission, as it will become clearly apparent from the following description.

SUMMARY OF THE INVENTION

The device according to the invention has the advantage of allowing omission this permanent connection, and of making use of the same sequential transmission system for all the sensors arranged in the streamer, including the sensor which transmits information representing the time of reception of the first received acoustic wave (reference time). For this purpose, the invention comprises means adapted for generating, starting from an initial time coinciding with the time of reception, and for a longer time than the time interval between two successive connections of the sensor to the recording or the processing system, through the sequential transmission system, a voltage varying over time in a known manner, means for selecting at least two discrete values of said voltage, produced at of time separated by a time interval $\Delta T$ higher than the time interval separating two successive transmissions of information elements issuing from said sensor, through said sequential transmission means, the latter being used for the transmission to the recording or the processing system of the discrete values constituting the information representing the time of reception of the first acoustic wave at said sensor.

The voltage varying over time in a known manner may vary a linearly or non linear, and increasing or decreasing variation according to a known equation. The equation in nature may, for example, be of a parabola hyperbola or exponential but, for reasons of simplicity, a linearly increasing variation is generally preferred.

The recording or processing system to which are transmitted the discrete values of the voltage comprises means for determining the initial time of reception of the first acoustic wave of the discrete values.

The device is designed that, in the absence of a reception of acoustic waves, the means for generating the variable voltage, referred to as integrating means, has a zero output voltage. These means comprise a switch controlled by means for shaping signal generated by the sensor in response to the acoustic wave it has received.

BRIEF DESCRIPTION OF THE DRAWINGS

Other characteristics and advantages of the invention will be made apparent from the following description of a non limitative particular embodiment of the invention relating to the application of marine seismic prospecting, given with reference to the accompanying drawings wherein.

DETAILED DISCUSSION OF THE INVENTION

Figure 1:
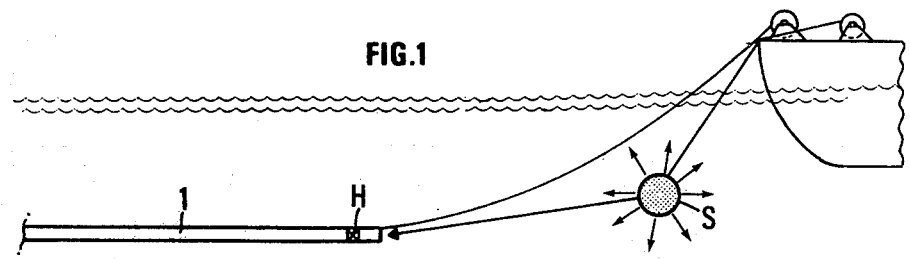
FIG. 1 is a schematic illustration showing a seismic streamer and a seismic source towed from a ship.

In FIG. 1, the seismic streamer 1, towed from the ship, comprises a sensor or hydrophone H, generally located at the head and used for determining the time of reception of the acoustic waves directly issued from a seismic source S, periodically triggered. The hydrophone H is connected to a recording or a processing system arranged on the ship, either by means of a continuous connection or in a discontinuous manner when the transmission of the signal detected therewith is also performed by means of a multiplexing transmission system.

Figure 2:
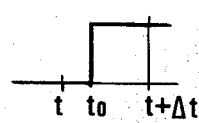
FIG. 2 shows a voltage square wave produced at initial time instant $t_0$ in the interval between two successive sampling time instants, in response to the reception of an acoustic wave.
Figure 4:
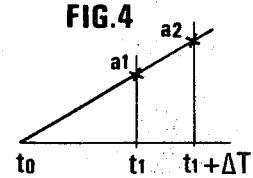
FIG. 4 shows a portion of a curve representing the variable voltage generated by the integrating means.

In such a system, the sensors or sensor groups, or the data acquisition devices, arranged spaced inside the seismic streamer for gathering and digitizing the seismic signals sensed by a specific number of transducers distributed all along a section, are cyclically and consecutively interrogated. In the case where hydrophone H is also connected to a multiplexing transmission system, it will be interrogated at a predetermined recurrence frequency $\Delta t$. The time $t_0$ when hydrophone H detects the arrival of the direct acoustic wave is generally intermediate between two successive sampling times t and $t + \Delta t$ (FIG. 2). Accordingly, it is necessary to wait until instant $t+\Delta t$, at which the hydrophone H will be again connected in order to transmit to the recording or processing system a indication of the change of level of the Schmitt trigger memorizing the reception of the wave. But this indication will also include a systematic error resulting from the failure to detect the exact instant of reception of the wave within the time interval $\Delta t$ of the recurrence period. This systematic error, which can be as high as $\Delta t$, is unacceptable since the required accuracy for the determination of $t_0$ is generally of the order of 0.1 ms, whereas the sampling period is comparatively much longer.

Figure 3:
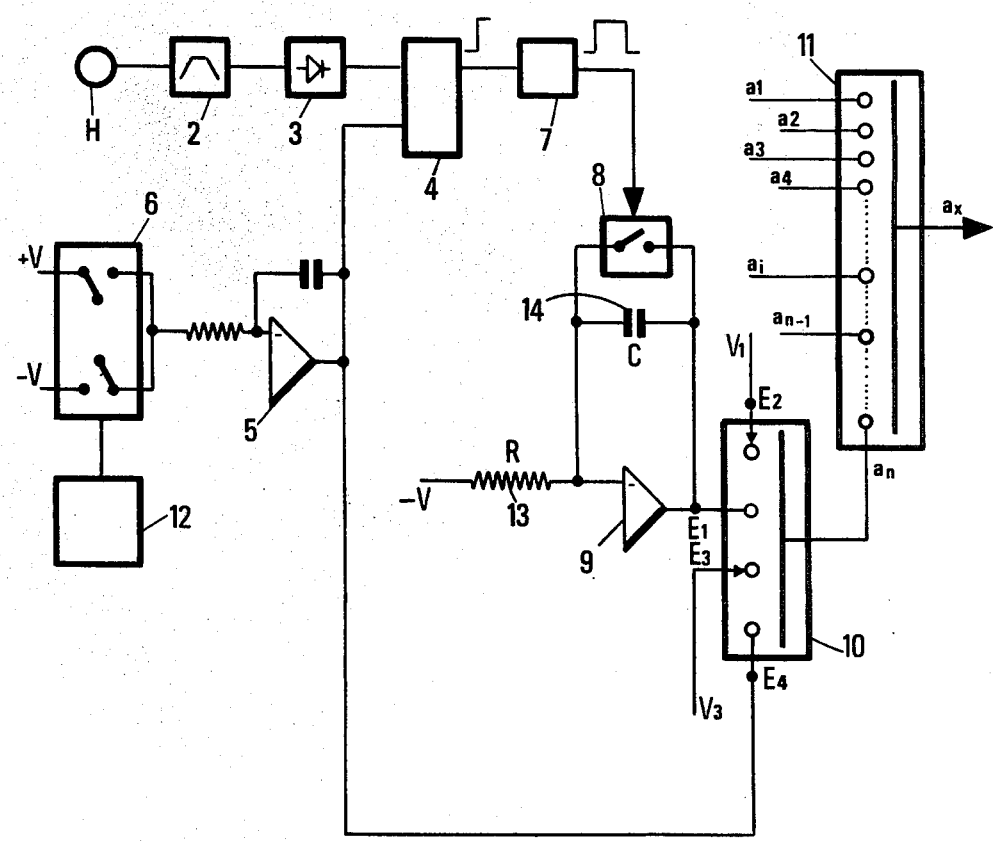
FIG. 3 is a schematic diagram illustrating the circuitry employed in the device of the invention.

In accordance with the device of the invention, it is possible to avoid this disadvantage. The device generally comprises (FIG. 3) a band-pass filter 2 limits the signal generated by the hydrophone H, to a frequency band comprised for example between 200 Hz and 800 Hz, an envelope detector 3 and a Schmitt trigger 4 which compares the level of the detected signal issued from detector 3 with a threshold voltage supplied by an integrator element 5. As soon as the level of the detected signal exceeds the value of the threshold voltage, the output of trigger 4 passes to the upper level, in a manner well known to those skilled in the art. The integrator element 5 is adapted for integrating either a positive voltage $+V$ or the symmetrically equivalent negative voltage $-V$. One or the other of these two voltages is applied to the input of the integrator 5 by means of a switch 6 which is actuated by a logic actuating assembly 12 which is in turn controlled by the recording or the processing system, during the time interval required for the level of the signal issued from the integrator to reach the predetermined value. The elements 5, 6 and, 12 make it possible to adjust at will the threshold value in order to adapt it to the amplitude of the signal issued from the hydrophone H. The nature and the position of the hydrophone H inside the seismic streamer is not critical. The output of the Schmitt trigger, is connected to the input of a second trigger or flip-flop of the monostable type 7. The square wave generated by the latter is used to control the opening of a switch 8, preferably of the electronic type, which directly connects, in the on position, the inverting input of an amplifier-integrator 9 forming the integrating means to its output. The inverting input of the amplifier 9 is connected, conventionally, on the one hand, to a source of negative voltage $-V$ through a resistor R and, on the other hand, to the output of the amplifier 9 through a condenser C, when the switch 8 is in off position. The output of integrator 9 is connected to one input $E_1$ of an auxiliary multiplexer 10 having four inputs, for example. To two other imputs $E_2$ and $E_3$ of this multiplexer are applied respectively two voltages $V_1$ and $V_3$ supplied by auxiliary means and to the input $E_4$ is applied the threshold voltage generated by the integrator element 5. The output of the auxiliary multiplexer 10 is connected to one of the inputs $a_n$ of a general multiplexer 11 having $n$ inputs, included in a local device for acquisition of the seismic data collected in the streamer section wherein the hydrophone H is located. The output of the general multiplexer 11 is connected to the input of a sample amplifier of a known type. The sampling period of each line of the general multiplexer 11 being equal to $\Delta t$, the sampling period of the auxiliary multiplexer 10 is selected so that its output is successively connected to its four inputs, at the successive times when line $a_n$ is sampled. The sampling period of each line of the auxiliary multiplexer by the general multiplexer is designated by $\Delta T$.

Having described the device of the invention, its operation will now be discussed.

The detection by hydrophone H of the arrival of the directly transmitted wave produces the triggering of the monostable flip-flop 7, and actuates the switch 8 to its "off" position. Since the switch was previously in the "on" position, the output voltage of integrator 9 was during that time equal to zero. The input of the integrator has a voltage $-V$ applied thereto, and the capacitor 14 begins to charged through resistor 13 as of the initial time where the switch is actuated to its off position, and the output voltage of the integrator linearly increases over time. At instant $t_1$, subsequent to instant $t_0$ of reception of the direct wave, a first sample of the output voltage of integrator 9, having for example a value $a_1$, is picked up and transmitted to the recording or processing system. At a subsequent instant, separated from the preceding one by a time interval $\Delta T$, equal to the sampling period by the general multiplexer 11 of the voltage issued from integrator 9, the output voltage of the integrator 9 is again sampled. The value $a_2$ of the new sample is also transmitted to the recording or processing system. Since the value of $\Delta T$ is known with great accuracy, the value of the slope of the straight line representing the variations of the output voltage in the integrator, and the successive transmitted values $a_1$ and $a_2$, the instant $t_0$ at which the previously zero voltage began to increase, may be easily determined from the following relationship:

$$t_0 = t_1 - \frac{a_1 \Delta T}{a_2 - a_1}$$

This determination may be performed by a special analog computer of a known type, or by a digital computer incorporated into the recording or processing system.

As soon as the square wave generated by the flip-flop 7 is discontinued, the switch 8 returns to its "on" position which resets to zero the output voltage of the integrator 9.

The operation time of integrator 9 between two successive time of zero reset, which corresponds to the length of the square wave generated by the flip-flop 7, must be sufficient to allow the transmission of two successive output voltages.

However, the integration time may be lengthened in order to transmit a greater number of samples of the integrator output voltage.

The threshold voltage used as reference by the Schmitt trigger being also transmitted intermittently to the recording or processing system, the recording or processing system may control its actual amplitude and, optionally, modify it before any subsequent triggering of the seismic source by actuating the switch 6 by means of the logic assembly 12.

What is claimed is:

1. A device for transmitting data, from a sensor adapted for receiving an acoustic signal, to a recording and processing system, said data being representative of the time of receipt of the acoustic signal by the sensor, comprising:

transmission means for intermittently and sequentially transmitting data from said sensor to said recording and processing system;

voltage generating means for generating a voltage linearly varying over time;

selecting means associated with said voltage generating means for detecting at least two discrete values of the voltage generated by said voltage generating means, at successive time instants separated by an interval of time $\Delta T$ greater than the intervals of time separating two successive transmissions of data from said sensor to said recording and processing system, said transmission means being adapted for transmitting data corresponding to said discrete voltage values, and to said time interval $\Delta T$, to said recording and processing system; and said recording and processing system being adapted to calculate the initial instant of time at which the acoustic signal is received by the sensor, by determining from the data transmitted, the slope of a straight graphical line connecting the two discrete voltage values separated by a time interval $\Delta T$, and calculating the initial instant of time from said slope.

2. A device according to claim 1, wherein said voltage generating means for generating the variable voltage comprises integrating means (9, 13, 14), and a switch (8) adapted for being actuated by shaping means for giving a desired shape to a signal generated by the sensor in response to the reception of the acoustic wave.

3. A device according to claim 2, wherein said shaping means for giving the desired shape to the signal received from the sensor comprises: a Schmitt trigger (4) adapted for being triggered when the amplitude of the signal from the sensor exceeds an adjustable threshold value, and a flip-flop of the monostable type (7) controlled by the signal issued from the Schmitt trigger and adapted for generating a square wave voltage during a time interval longer than ($\Delta T$).

4. A device according to claim 1, wherein said reference voltage applying means comprises a double switch (6) actuated by an actuating logic assembly (12) controlled by the recording or processing system.

5. A device according to claim 1, wherein said transmission means comprises a multiplexer, and wherein the voltage generating means comprises integration means (9), and the output of said voltage generating means is connected to one of the inputs of the multiplexer.

6. A device according to claim 1, wherein said transmission means comprises a general multiplexer and an auxiliary multiplexer, and wherein the voltage generating means comprises integration means (9), and the output of the voltage generating means is connected to a first input of the auxiliary multiplexer (10), and the output of the auxiliary multiplexer is connected to an input of the general multiplexer (11).

7. A device according to claim 3, wherein said adjustable threshold value is generated by means of an integrator element (5) having first and second reference voltage applying means (6, 12) connected thereto for applying to the input thereof one of said first or second reference voltages over an adjustable time interval, and said integrator element (5) connected to said Schmitt trigger (4) for applying the adjustable threshold value thereto.

8. A device according to claim 7, wherein said transmission means comprises a general multiplexer (11) and an auxiliary multiplexer (10), and wherein the voltage generating means comprises integration means (9), and the output of the voltage generating means is connected to a first input of the auxiliary multiplexer whose output is connected to an input of the general multiplexer and the output of the integrator element (5) is connected to a second input of the auxiliary multiplexer.

9. In a method of marine seismic prospecting comprising transmitting an acoustic wave from a seismic source and detecting the time at which the directly transmitted seismic wave is received at a predetermined first sensor, with the echoes of the acoustic wave being detected by a predetermined arrangement of second sensors whereby the time of reception of the directly transmitted wave at the first sensor is used in a comparison system to determine the propagation time of the echoes, the improvement comprising a method, in a system wherein the first sensor is intermittently connected to a processing and recording system for transmitting data thereto indicating a receipt of the direct acoustic wave, of determining the time of reception of the directly transmitted acoustic wave which comprises the steps of:

generating a voltage varying over time in a predetermined manner upon receipt of the directly transmitted wave at the predetermined first sensor;

detecting at least two discrete values of the voltage generated in the predetermined manner, at successive time instants separated by an interval of time $\Delta T$ greater than the intervals of time separating two successive transmission of data from the predetermined first sensor to the recording and processing system; and calculating from the discrete voltage values detected, and from the interval of time $\Delta T$, the time of receipt of the acoustic wave at the first sensor.

10. A method according to claim 9 wherein the marine seismic prospecting is conducted with sensor array arranged underwater and towed from a ship.

11. A device for determining the time of reception of an acoustic signal at a sensor, comprising:

sensing means associated with sequential data transmission means for being intermittently connected for transmitting data to a recording and processing system;

voltage generating means for generating a voltage varying over time in a predetermined manner;

trigger means associated with said sensing means and with said voltage generating means for triggering the operation of said voltage generating means at the time of receipt of the acoustic signal at said sensing means;

selecting means associated with said voltage generating means for detecting at least two discrete values of the voltage generated by said voltage generating means, at successive time instants separated by an interval of time $\Delta T$ greater than the intervals of time separating two successive transmissions of data from said sensing means to said recording and processing system; and determining means associated with said selecting means for calculating, from said transmitted discrete values of said voltage and said interval of time $\Delta T$, the time of reception of the acoustic signal at said sensing means.

12. A device according to claim 11, wherein said voltage generating means comprises an integrator adapted for generating a linearly increasing voltage, and said determining means is adapted for calculating the slope of a line graphically connecting said discrete valves of said detected voltages.

* * * * *